Sept. 25, 1956    K. L. SANDERS, JR    2,764,726
REVERSIBLE-POLARITY DIRECT-CURRENT OUTPUT MAGNETIC
AMPLIFIER REQUIRING ONLY ONE
ALTERNATING-CURRENT SOURCE
Filed Nov. 22, 1952
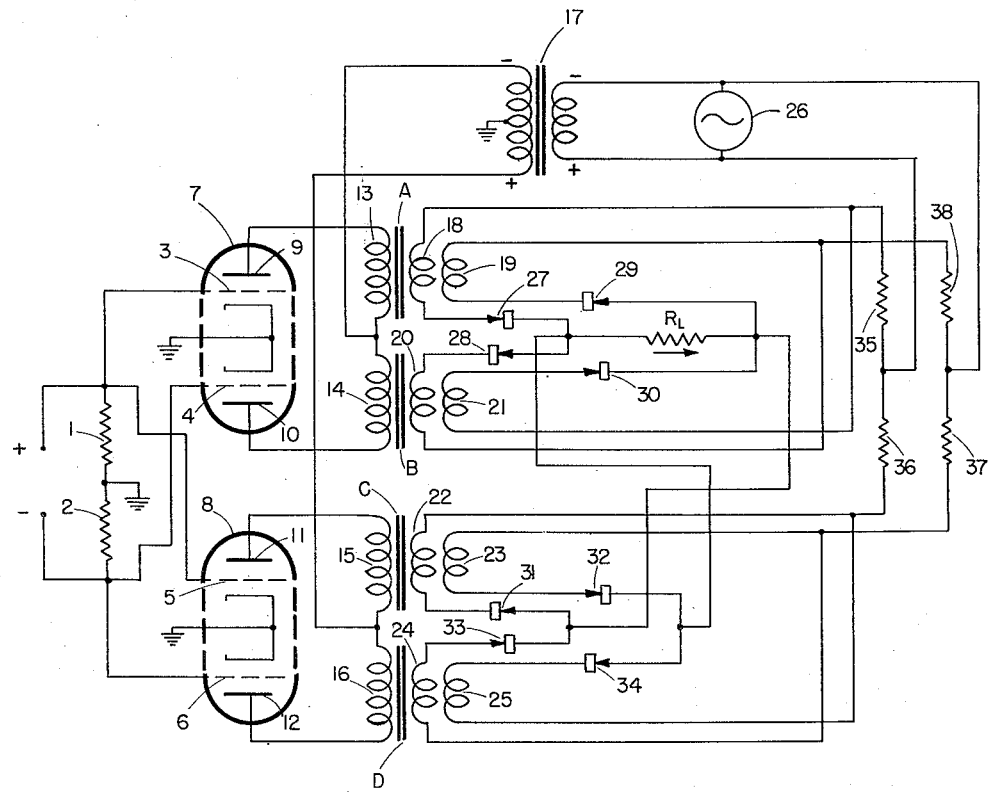
*INVENTOR.*
KEITH L. SANDERS JR.
BY William R. Lane
ATTORNEY

United States Patent Office 2,764,726
Patented Sept. 25, 1956

2,764,726

REVERSIBLE-POLARITY DIRECT-CURRENT OUTPUT MAGNETIC AMPLIFIER REQUIRING ONLY ONE ALTERNATING-CURRENT SOURCE

Keith L. Sanders, Jr., Paramount, Calif., assignor to North American Aviation, Inc.

Application November 22, 1952, Serial No. 321,971

2 Claims. (Cl. 321—25)

This invention relates to magnetic amplifiers, and particularly to an improved magnetic amplifier circuit adapted to supply a two-terminal load with a full-wave, reversible-polarity, direct-current voltage.

In patent application Serial No. 314,623 filed October 14, 1952 in the name of Keith L. Sanders, Jr. for "Minimum Time Delay Magnetic Amplifier," there is disclosed a series of magnetic amplifiers adapted to supply reversible-polarity direct-current voltage. These circuits, however, require a plurality of isolated alternating current supply voltages which, in the case of circuits designed to deliver only a small output power, lead to an unnecessary weight penalty. This invention contemplates a modified magnetic amplifier circuit somewhat similar in principle to that disclosed in the above patent application, but requiring only a two-terminal alternating current supply, and having a relatively low time delay and a sufficiently high efficiency to recommend its use for low-power output requirements.

It is therefore an object of this invention to provide an improved magnetic amplifier.

It is another object of this invention to provide a magnetic amplifier to supply a two-terminal load with full-wave, reversible-polarity, D.-C. voltage.

It is another object of this invention to provide a magnetic amplifier of minimum weight.

Other objects of invention will become apparent from the following description taken in connection with the accompanying single figure which is a schematic drawing of the invention.

Referring to the single figure, it is apparent that the invention includes four saturable reactor cores labeled "A," "B," "C," and "D" in the drawing. An input signal is supplied across resistors 1 and 2 to grids 3, 4, 5, and 6 of double triodes 7 and 8. Plates 9, 10, 11, and 12 of these triodes are connected, as shown, to control windings 13, 14, 15, and 16 on saturable reactor cores A, B, C, and D, respectively, as shown. Alternating current is supplied to these windings by transformer 17. Cores A, B, C, and D carry load windings 18, 19, 20, 21, 22, 23, 24, and 25, as shown, which windings are connected to alternating current supply 26 through rectifiers 27, 28, 29, 30, 31, 32, 33, and 34 and resistors 35, 36, 37, and 38. An electrical load to be driven by the amplifier is represented by R_L. For optimum speed of response to transients in the control windings, each of these resistors is made equal in resistance to that of R_L. The function of these resistors, as in U. S. Serial No. 314,623 is to prevent transformer action of the cores during transient of the control or input signal.

In operation, alternating current is supplied to plates 9, 10, 11, and 12 of double triodes 7 and 8, as shown. The input signal is applied to grids 3, 4, 5, and 6, and thus controls the conduction of the triodes and hence the current flow through control windings 13, 14, 15, and 16. For example, with the polarities indicated in the single figure, a positive signal is applied to grid 5 of triode 8, and during the half cycle of the supply voltage indicated in the figure a positive potential appears upon plate 11 of triode 8. Current is thus caused to flow in control winding 15; while during the same half cycle, current is positively prevented from flowing through control windings 14 and 16. Current does not flow through control winding 13 for the reason that plate 9 of triode 3 is held at a negative potential during the half cycle under consideration. With the arrangement shown, cores A, B, C, and D are saturated by the flow of current through the load windings associated therewith, and the control windings are effective in resetting these cores. If no current flows in the control windings, then the cores are not reset and, hence, remain saturated. With the polarities indicated in the figure, then, cores A and C successively magnetize and reset each succeeding half cycle of the supply voltage. Cores B and D, on the other hand, remain saturated because the control windings associated therewith do not, while the control signal is of the polarity indicated in the figure, ever conduct. If the control signal is full on and reversed in polarity, obviously cores A and C remain saturated, while cores B and D successively magnetize and reset during succeeding half cycles of the supply voltage.

It has been assumed for purposes of explanation that the control current was sufficient to reset the associated core in each case in the various half-cycles discussed. If the control current is less than this required value, obviously the core is not completely reset during the reset half-cycle and hence the load winding associated therewith conducts for a part of the succeeding (magnetizing) half cycle. The duration of the portion of the cycle during which the load winding conducts is, of course, determined by the magnitude of the control current.

During the half cycle of the supply voltage indicated by the polarities shown in the single figure and with the control signal applied as indicated, current flows from source 26 through resistor 35, load winding 21, rectifier 30, the load, rectifier 28, load winding 20, and resistor 38. Thus, it is seen that during this half cycle, current flows through the load from right to left in the figure. During the next succeeding half cycle, current flows through resistor 37, load winding 24, rectifier 33, the load, rectifier 34, load winding 25, and resistor 36. Again, it is seen that current flow through the load is from right to left in the figure. During this same time, cores A and C successively magnetize and reset.

When the polarity of the input signal is reversed, cores B and D successively magnetize and reset, and cores A and C remain saturated. During the half cycle indicated by the polarities depicted in the single figure, current flows from source 26 through resistor 35, load winding 18, rectifier 27, the load, rectifier 29, load winding 19, and resistor 38. Current thus flows through the load from left to right in the figure. During the next succeeding half cycle, current flows from source 26 through resistor 37, load winding 23, rectifier 32, the load, rectifier 31, load winding 22, and resistor 36. Again, current flows from left to right through the load. Thus it is seen that by changing the polarity of the control signal applied to triodes 7 and 8, the direction of current flow through the load has been changed. There has thus been provided a polarity-reversible, direct-current output magnetic amplifier requiring but a single alternating-current source, inasmuch as source 26 has but two terminals.

The time delay incident to transients in the control circuit takes place as follows: The first transient to be considered is from quiescent condition of the amplifier— that is, when none of the cores are saturated, and hence the load is receiving little or no current—to the condition where a full output in the positive direction is achieved. In this discussion, the positive direction will be assumed to be with current flowing from right to left through the load. If the transient is initiated at the beginning of the half cycle indicated in the figure, cores A and B, previously fully reset, become fully saturated; core C, previously fully reset, becomes fully saturated; and core D, previously fully saturated, remains so. On the succeeding half cycle, core A resets to one-third of saturation; core B, previously fully saturated, remains so; core C, previously fully reset, becomes magnetized to two-thirds of saturation; and core D conducts full load current. On the next succeeding half cycle, which is again represented by the polarity shown in the figure, core A becomes magnetized to saturation, core B conducts full load current, core C is fully reset, and core D remains saturated. Thus, core C is operating over the lower two-thirds of the hysteresis loop, and core A is operating over the upper two-thirds of the hysteresis loop. In time, core A moves downward on the hysteresis loop and, finally, both cores A and B operate over the lower two-thirds of the hysteresis loops. This transient from quiescent to fully positive output thus takes place with a time delay of one-half cycle.

The second transient to be considered is that which occurs when the amplifier is changed from full positive output to quiescent condition. Assuming again that the transient is initiated at the beginning of the half cycle indicated by the polarities shown in the single figure, core A, previously fully reset, becomes magnetized to two-thirds saturation; core B conducts full load current; core C, previously magnetized to two-thirds of saturation, becomes fully reset; and core D, previously fully saturated, becomes fully reset.

On the next succeeding half cycle, there is no current flow through the load because cores A and B become fully reset, and cores C and D become fully magnetized. Thus, this transient takes place with a time delay of one-half cycle.

Now, when the transient results in a change of the output from full positive to full negative and assuming again that the transient is initiated at the beginning of the half cycle indicated by the polarities shown in the single figure, during this first half cycle, core A, which must have been fully reset, becomes magnetized to two-thirds of saturation. Core B conducts full load current; core C, previously magnetized to two-thirds of saturation, remains thus magnetized; and core D becomes fully reset.

During the next succeeding half cycle, core A remains magnetized at two-thirds of saturation; core B becomes reset to two-ninths of saturation; core C conducts negative load current for two-thirds of the half cycle; and core D becomes magnetized to seven-ninths of saturation.

During the next succeeding half cycle, core A conducts negative load current for two-thirds of the half cycle; core B becomes magnetized to full saturation; core C remains fully saturated; and core D becomes fully reset.

During the fourth half cycle, core A remains fully saturized; core B becomes reset to one-third of saturation; core C conducts full load current, indicating that the transient is completed; and core D becomes magnetized to two-thirds of saturation.

During succeeding half cycles, either core A or core C conducts while the other of these two cores remains saturated, while cores B and D alternately and successively become magnetized and fully reset. Thus, core B is caused to operate from one-third of saturation to full saturation; and core A operates over the lower two-thirds of the hysteresis loop. Because the transformer is non-ideal, core B will, in time, be caused to move down and operate over the lower two-thirds of the hysteresis loop. The transient from full positive output to full negative output is thus completed with a time delay of 1½ cycles.

There is thus provided a magnetic amplifier requiring only a two-terminal source of alternating current and providing a polarity-reversible direct-current output to a two-terminal load. A time delay of only one-half cycle is experienced between the initiation of a transient in the control circuit and the realization of the transient in the load circuit under all conditions of initiation of a transient, except when the output of the device is caused to change from full positive to full negative, or from full negative to full positive. The theoretical efficiency of this output circuit is 33⅓ percent.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Magnetic amplifier means for supplying a two-terminal electrical load with reversible-polarity direct current from a two-terminal alternating-current supply comprising a first current path including, in order, said alternating current source, a first resistor, a first load winding on a first saturable reactor core, a first rectifier, said load, a second rectifier, a second load winding on said first saturable reactor core, and a second resistor; a second current path including, in order, said alternating-current source, a third resistor, a first load winding on a second saturable reactor core, a third rectifier, said load, a fourth rectifier, a second load winding on said second saturable reactor core, and a fourth resistor; a third current path including, in order, said alternating-current source, said first resistor, a first load winding on a third saturable reactor core, a fifth rectifier, said load, a sixth rectifier, a second load winding on said third saturable reactor core, and said second resistor; and a fourth current path including, in order, said alternating-current source, said third resistor, a first load winding on a fourth saturable reactor core, a seventh rectifier, said load, an eighth rectifier, a second load winding on said fourth saturable reactor core, and said fourth resistor; all said resistors being equivalent in resistance to that of said load, and all said rectifiers being oriented to allow current flow in a direction indicated by the order of said elements; and control means responsive to an input signal for allowing said saturable reactor cores to saturate selectively, whereby if said first and fourth saturable reactor cores are saturated said load receives direct current of one polarity, while if said second and third saturable reactor cores are saturated said load receives direct current of the opposite polarity.

2. Magnetic amplifier means for furnishing a two-terminal electrical load with reversible-polarity direct current from a two-terminal alternating-current supply comprising two pairs of saturable reactor controlled current paths through said load, each path in each pair allowing current flow through said load in a differing direction than the other path in said pair during each differing half cycle of said alternating current supply, resistors connecting each end of each pair of said paths to different terminals of said alternating current source and means for selectively controlling said saturable reactors, said saturable reactor-controlled current paths including a saturable reactor and a rectifier in series connected to each end of said load, with said rectifiers connected adjacent said load and oriented to allow current flow through said load in a predetermined direction to thereby furnish reversible polarity direct current to said load from said alternating current source.

References Cited in the file of this patent

UNITED STATES PATENTS

| | | |
|---|---|---|
| 2,453,624 | Glass | Nov. 9, 1948 |
| 2,458,937 | Glass | Jan. 11, 1949 |
| 2,493,130 | Glass | Jan. 3, 1950 |
| 2,571,708 | Graves | Oct. 16, 1951 |
| 2,634,395 | Glass | Apr. 7, 1953 |
| 2,704,823 | Storm | Mar. 22, 1955 |